United States Patent

[11] 3,549,797

[72] Inventor Bert H. Dann
Altadena, Calif.

[21] Appl. No. 665,435
[22] Filed Sept. 5, 1967
[45] Patented Dec. 22, 1970
[73] Assignee Bell & Howell Company
Chicago, Ill.
a corporation of Illinois

[54] TRACK ALIGNMENT SYSTEM IN SLANT-TRACK VIDEO TAPE RECORDER
6 Claims, 1 Drawing Fig.

[52] U.S. Cl. .......... 178/6.6, 179/100.2
[51] Int. Cl. .......... H04n 5/78, G11b 5/58, G11b 15/57
[50] Field of Search .......... 178/6.6A, PSC; 179/100.25, MI, 100.3B, D; 340/174.1B

[56] References Cited

UNITED STATES PATENTS

| | | | |
|---|---|---|---|
| 3,213,193 | 10/1965 | Konishi | 178/6.6 |
| 3,327,299 | 6/1967 | Johnson | 340/174.1 |

*Primary Examiner*—Stanley M. Urynowicz, Jr.
*Assistant Examiner*—Raymond Cardillo, Jr.
*Attorney*—Raymond A. Andrew

ABSTRACT: A slant-track video recorder includes equipment for correcting misalignments of recorded information in adjacent recording tracks. This correcting equipment includes a pair of stationary pickup heads which produce electric signals that are indicative of recorded synchronization signals at spaced regions of the recording tape. A phase detector compares these signals and drives a servosystem that adjusts relative tape speed for restoring the requisite signal record alignment.

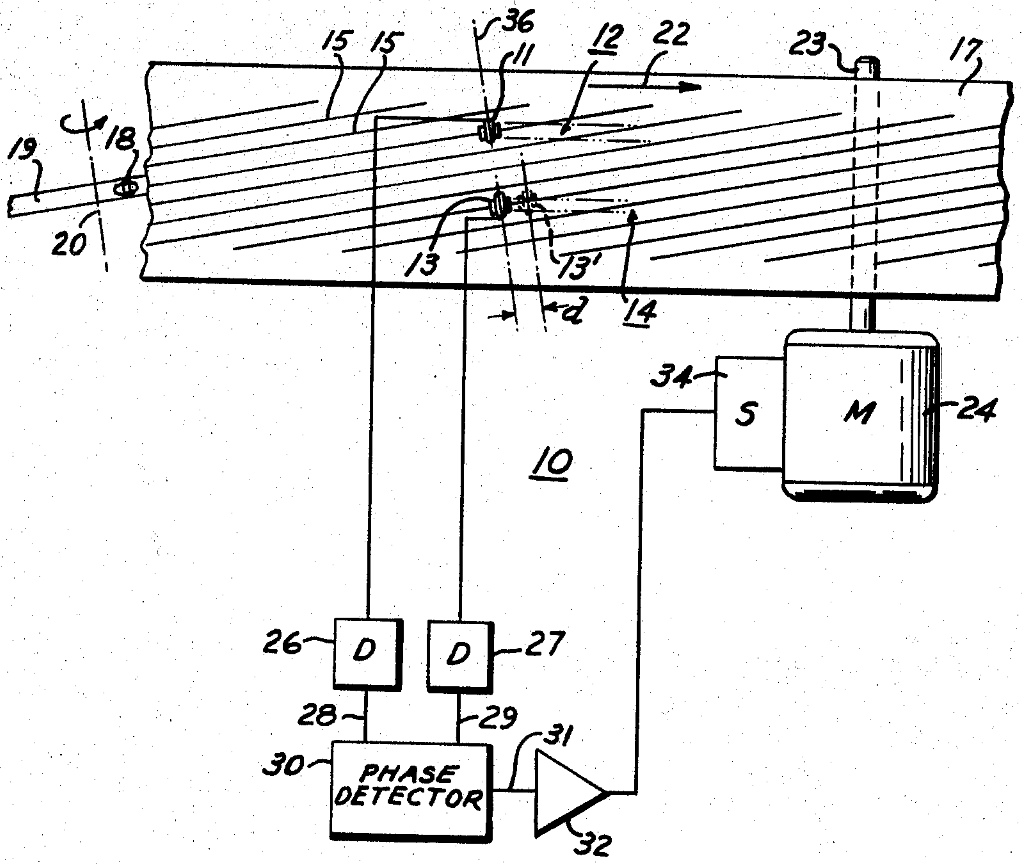
INVENTOR.
BERT H. DANN
BY Raymond A. Andrew
ATTORNEY.

TRACK ALIGNMENT SYSTEM IN SLANT-TRACK VIDEO TAPE RECORDER

BACKGROUND OF THE INVENTION

1. Field of the Invention

The subject invention relates to the art of information recording and, more particularly, to video tape recorders and track alignment systems for slant-track video tape recorders.

2. Description of the Prior Art

The recording of information is adjacent recording tracks is well known. A familiar example is the slant-track recording technique widely employed for the recording of video signals and television programs.

This technique generally works well as long as the playback speed of the recording tape is the same as the tape speed at which the video signals were recorded. However, video signals are frequently played back at tape speeds that are different from the tape speed which prevailed during recording. In this case, the playback head necessarily crosses from one slant track to another. This, in turn, results in phase discontinuities in the reproduced video signals, unless corresponding elements of horizontal image lines recorded in adjacent slant tracks are mutually aligned, so that playback head crossover operations proceed from an element in one horizontal image line to a substantially corresponding element in another horizontal image line.

In practice, video tape recording equipment has to be of a very high quality and relative complexity to assure the continued existence of the above mentioned intertrack correspondence of horizontal image line elements.

SUMMARY OF THE INVENTION

The subject invention solves the above mentioned problem by sensing the relative alignment of information recorded in adjacent recording tracks, such as video signals recorded in adjacent slant tracks, to provide a signal which is indicative of the relative alignment or degree of misalignment of such information, and which may be used to control the information recording process so as to reestablish the desired information intertrack alignment. More specifically, the invention resides in apparatus comprising at least one rotating recording head for recording video signals including synchronization information in slanted-recording tracks on a recording tape moving relatively to the recording head. The invention further resides in the improvement for procuring mutual alignment of signal records in adjacent recording tracks.

According to the subject invention the latter improvement comprises, in combination, first means including a first relatively stationary pickup head, operatively associated with the moving recording tape during the recording of the video signals by the rotary recording head, for picking up information from the slanted-recording tracks within a first predetermined region extending at an angle to the slanted recording tracks to produce a first electric signal indicative of recorded synchronization information, and second means including a second relatively stationary pickup head, operatively associated with the moving recording tape during the recording of the video signals by the rotary recording head and spaced from the first pickup head, for picking up information from the slanted-recording tracks within a second predetermined region extending at an angle to the slanted-recording tracks to produce a second electric signal indicative of recorded synchronization information.

The improvement according to the subject invention further includes third means connected to the first and second means for comparing the first and second electric signals to produce a third electric signal indicative of misalignments of signal records in adjacent recording tracks, and fourth means connected to the third means for adjusting during the recording of the video signals by the rotary recording head the rate of relative movement of the recording tape in response to the third signal to restore the mutual alignment of recorded video signals.

BRIEF DESCRIPTION OF THE DRAWING

The accompanying drawing diagrammatically illustrates an alignment sensing and control system in accordance with a preferred embodiment of the invention.

DESCRIPTION OF THE PREFERRED EMBODIMENTS

The illustrated system 10 includes a first magnetic pickup head 11 which picks up information from a first region 12, and a second magnetic pickup head 13 which picks up information from a second region 14 of slanted-recording tracks 15. These tracks are recorded on a magnetic tape 17 by at least one recording head 18 which is mounted on a slanted disc 19 that is rotated about an axis 20. The means for energizing the head 18 with video signals, the drive means for slanted disc 19, and the guiding means for the tape 17 are not shown as well-known conventional recording equipment may be employed for establishing the tracks 15.

The tape 17 is driven in the direction of the arrow 22 by a capstan 23 which is rotated by a drive motor 24 so as to impart a desired speed on the tape.

The video information recorded in each of the tracks 15 includes several horizontal image lines, including a horizontal sync signal for each line. For instance, each image track may contain an image field with all its horizontal lines, or an entire image frame. Also, the tracks are preferably recorded wide enough so that the spaces between immediately adjacent tracks are minimal.

Each of the heads 11 and 13 is preferably wider than one track. For instance, the lateral width of each air gap (not shown) of the heads 11 and 13 may be equal to one and one-half the width of each track 15. In this manner, there is no signal loss between adjacent tracks when the heads 11 and 13 operate, respective, in the track regions 12 and 14, and low-frequency modulations in the head outputs are reduced.

Each of the heads 11 and 12 delivers output signals which contain information produced by the horizontal sync signals recorded in the tracks. Since the linear speed of the tape 22 is conventionally much lower than the angular speed of the recording head 18, and since the heads 11 and 13 are stationary relative to the tape, the horizontal sync signals picked up by the heads 11 and 13 appear at the output of these heads at a rate which is much lower than the conventional 15,750 pulse per second horizontal scanning rate. This is advantageous, since such lower pulse rates are more conveniently handled by a servo system.

Also, modern video tape-recording processes record the signals in modulated form and preferably employ frequency modulation for this purpose. Typically, the average carrier frequency employed in such processes is in the 3MHz-range. Of course, the above-mentioned lower linear tape speed causes also these oscillations to appear at a materially reduced frequency at the outputs of the heads 11 and 13. Accordingly, the heads 11 and 13 are, respectively, connected to demodulators 26 and 27 which may be of a conventional design and which are constructed in accordance with techniques known per se to demodulate the output signals of the heads 11 and 13.

The demodulated output signals of the demodulator 26 are supplied to the first input 28, while the demodulated output signals of the demodulator 27 are supplied to the second input 29 of a phase detector 30 which may also be of a conventional type and which provides at its output 31 a signal which is indicative of a phase difference between the horizontal sync information picked up from the region 12 and the horizontal sync information picked up from the region 14 of the tracks 15. Since such phase difference is produced by a misalignment of horizontal image line information in region 14 with respect to horizontal image line information in region 12, the output signal provided by the phase detector 30 is itself indicative of such misalignment.

This misalignment may be corrected by adjusting the linear speed of the tape 17 in accordance with the output of the phase detector 30. To this end, the output signal of the phase detector 30 is amplified by an amplifier 32 and is thereupon applied to a servo arrangement 34 which is designed to vary the speed of the motor 24 in the sense just mentioned. Servo arrangements which perform speed variation functions in response to electric error signals are already known as such in the art.

While demodulators 26 and 27 are shown in the drawing, it has been found that the desired image line information for driving the phase detector 30 can frequently be obtained by an amplification of the output signals of the heads 11 and 13. In this case, the demodulators 26 and 27 may be replaced by amplifiers.

As shown in the drawing, the pickup regions 12 and 14 are laterally spaced from each other and extend longitudinally in the direction of the tape movement 22. The heads 11 and 13, that is their air gaps (not shown), are aligned on a geometrical line which extends at right angles to the tracks 15.

A different arrangement may be employed if it is desired that the phase detector 30 provide a phase difference output signal when the horizontal line information in adjacent tracks is mutually aligned. In this case, the head 13, for instance, may be laterally offset by a distance *d* from the line 36 as indicated at 13'. The distance *d* may, for example, be such that the detector inputs 28 and 29 receive their input signals at a relative phase difference of 90° when intertrack alignment exists.

Other modifications are apparent to those skilled in the art.

I claim:

1. In apparatus comprising at least one rotating recording head for recording video signals including synchronization information in slanted-recording tracks on a recording tape moving relatively to the recording head, the improvement for procuring mutual alignment of signal records in adjacent recording tracks, comprising in combination:

a. first means including a first relatively stationary pickup head operatively associated with said moving recording tape during the recording of the video signals by said rotary recording head for picking up information from said slanted-recording tracks within a first predetermined region extending at an angle to the slanted-recording tracks to produce a first electric signal indicative of recorded synchronization information;

b. second means including a second relatively stationary pickup head operatively associated with said moving recording tape during the recording of the video signals by said rotary recording head and spaced from said first pickup head for picking up information from said slanted-recording tracks within a second predetermined region extending at an angle to the slanted-recording tracks to produce a second electric signal indicative of recorded synchronization information;

c. third means connected to said first and second means for comparing said first and second electric signals to produce a third electric signal indicative of misalignments of signal records in adjacent recording tracks; and d. fourth means connected to said third means for adjusting during the recording of the video signals by said rotary recording head the rate of relative movement of said recording tape in response to said third signal to restore said mutual alignment.

2. Apparatus as claimed in claim 1, wherein:

a. said recorded video signals are modulated;

b. said first means including means connected to said first pickup head for demodulating information picked up from said first region; and c. said second means including means connected to said second pickup head for demodulating information picked up from said second region.

3. Apparatus as claimed in claim 1, wherein said first and second pickup heads are located on a geometrical line intersecting said recording tracks substantially at right angles.

4. Apparatus as claimed in claim 1, wherein said second pickup head is spaced from a geometrical line which intersects said recording tracks at right angles and extends through a point of engagement of said first pickup head and said recording tape.

5. Apparatus as claimed in claim 1, wherein said third means include phase detector means for producing third electric signals corresponding to differences in phase between said first and second electric signals.

6. Apparatus as claimed in claim 1, wherein said fourth means include servo control means connected to said third means for varying the rate of relative movement of said recording tape in response to said third signal during the recording of the video signals by said rotary recording head.